Patented Apr. 9, 1940

2,196,719

UNITED STATES PATENT OFFICE 2,196,719

PRESERVATION OF RUBBER

William Baird, Richard Frank Goldstein, Maldwyn Jones, and Edwin Marshall Meade, Blackley, Manchester, England, assignors to Imperial Chemical Industries Limited, a corporation of Great Britain No Drawing. Application October 14, 1936, Serial No. 105,620. In Great Britain October 15, 1935

2 Claims. (Cl. 260—808)

This invention relates to the preservation of rubber and particularly to the treatment of rubber with compounds which will retard the deterioration normally due to the action of light, heat and oxygen and flexing.

It is well known to those accustomed to handling rubber articles that the rubber perishes with the passage of time. It is also known to those skilled in the manufacture of rubber articles that rubber can undergo various types of mechanical failure, such, for instance, as the cracking, which follows repeated flexing.

It is known that the perishing of rubber is due largely to oxidation, but the causes of the various types of mechanical failure such as flex-cracking are less known but it is probable that oxidation is one of them. The preservation of rubber against perishing has long been a goal for rubber technologists, and more recently efforts have also been directed towards preserving the rubber against the various kinds of mechanical failure. The step taken to effect this preservation is that of incorporating in the rubber a small proportion of a suitable preserving agent. The preserving agents are usually spoken of as antioxidants, for reasons which can be seen from the foregoing.

An object of the present invention is to provide compounds for retarding the deterioration and flex-cracking of rubber. A still further object is to provide rubber which is more resistant against deterioration due to the action of light, heat and oxygen and flexing. Further objects are to provide new compositions of matter and to advance the art. Still further objects will appear hereinafter.

The above and other objects are accomplished by the following invention which comprises incorporating with rubber before or after vulcanisation thereof certain tertiary amines.

The compounds which are to be added to rubber in accordance with our invention constitute a class having the general type formula

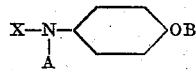

where X represents the radical of a member of the homologous series of benzene hydrocarbons; A represents an alkyl group and B represents hydrogen or an alkyl group.

N - Methyldiphenylamine and N - benzyl - N-methyldiphenylamine, although not within the class of our invention are tertiary amines, which have been mentioned as preservatives for rubber. The compounds of our invention are however better preservatives as can be seen from the test-data given hereinafter.

Some of the members of this new class which have been found to be particularly effective are as follows:

4-Methoxy- 4'-methyl-N-methyldiphenylamine

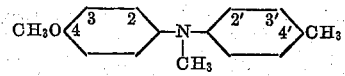

3'-Methoxy-N-methyldiphenylamine, 3'-methoxy-3'-methyl-N-methyldiphenylamine, 4-methoxy-4' - n - butyl - N - methyldiphenylamine, 2'-methoxy-4'-n-butyl-N-methyldiphenylamine, 4-methoxy- 4'-tert.butyl -N- methyldiphenylamine, 4-propoxy-4'-methyl-N-methyldiphenylamine, 4-iso - propoxy -4'-methyl -N- iso - propyldiphenylamine, 4-propoxy-N-propyldiphenylamine, 4-isopropoxy-N-iso-propyldiphenylamine, and 4-hydroxy-4'-methyl-N-methyldiphenylamine.

4-Methoxy-4'-methyl-N-methyldiphenylamine, a new compound, may be made by exhaustive methylation of 4-hydroxy-4'-methyldiphenylamine with dimethyl sulfate: it forms almost colourless crystals m. p. 54–56° and boils about 190° at 15 mm. 4-iso-Propoxy-N-iso-propyldiphenylamine, a new compound may be made by alkylating p-hydroxydiphenylamine with excess iso-propyl bromide. 4-Methoxy-4'-n-butyl-N-methyldiphenylamine, a new compound, may be made by methylating 4-methoxy-4'-n-butyldiphenylamine with dimethylsulfate: it boils at 180–195° at 4 mm. 4-n-Butoxy-4'-methyl-N-methyldiphenylamine, a new compound, may be made by alkylating 4-hydroxy-4'-methyl-N-methyldiphenylamine with butyl iodide: it melts at 57–66° in the crude state. 4-Hydroxy-4'-methyl-N-methyldiphenylamine may be made by demethylating 4-methoxy-4'-methyl-N-methyldiphenylamine with hydriodic acid: recrystallised from a mixture of petroleum ether and benzene it forms white flaky crystals m. p. 75–79°. Other compounds in the class may be made by analogous methods.

Preferred compounds for use according to our invention are 4-iso-propoxy-N-iso-propyldiphenylamine, 4-methoxy-4'-methyl-N-diphenylamine and 4 - butoxy -4'- methyl -N- methyldiphenylamine.

In order to more fully illustrate our invention, and the preferred modes of carrying the same into effect and the advantageous results to be obtained thereby, the following example is given.

Example

Antioxidant tests were carried out with vulcanisates from the following rubber mixes, mixes F and G being given for purposes of comparison.

|  | A | B | C | D | E | F |
|---|---|---|---|---|---|---|
| Smoked sheet rubber | 100 | 100 | 100 | 100 | 100 | 100 |
| Gas black | 40 | 40 | 40 | 40 | 40 | 40 |
| Zinc oxide | 5 | 5 | 5 | 5 | 5 | 5 |
| Stearic acid | 4 | 4 | 4 | 4 | 4 | 4 |
| Sulfur | 3.25 | 3.25 | 3.25 | 3.25 | 3.25 | 3.25 |
| Diphenylguanidine | 1 | 1 | 1 | 1 | 1 | 1 |
| 4-methoxy-4'-methyl-N-methyl-diphenylamine | 1 |  |  |  |  |  |
| 4-methoxy-4'-n-butyl-N-methyl-diphenylamine |  | 1 |  |  |  |  |
| 4-n-butoxy-4'-methyl-N-methyl-diphenylamine |  |  | 1 |  |  |  |
| 4-hydroxy-4'-methyl-N-methyl-diphenylamine |  |  |  | 1 |  |  |
| N-methyldiphenylamine |  |  |  |  | 1 |  |
| N-benzyl-N-methylaniline |  |  |  |  |  | 1 |

The mixes were vulcanised by heating for 1 hour at 141° C. and samples of the vulcanisates subjected to artificial ageing by heating at 70° C. in oxygen at 300 lb./sq. in. for a period of 4 days. The degree of ageing was then determined by measuring the tensile strengths of the samples, the following results being obtained.

| Mix | Tensile strength in kg/sq. cm. | |
|---|---|---|
|  | Before ageing | After 4 days ageing |
| A | 252 | 134 |
| B | 265 | 150 |
| C | 258 | 124 |
| D | 250 | 110 |
| E | 253 | 79 |
| F | 252 | 46 |

Samples of the vulcanisates were also submitted to accelerated flex-cracking tests on the Du Pont machine (Rubber Age, New York, 1930, 26, 542). The resistance of vulcanisates A, B, C and D to flex-cracking was greater than that of E or F.

It will be evident from the above example that a large number of compounds are adapted for use to come within the scope of the invention. We have shown the hydroxy and alkoxy-N-alkylphenylamines to be effective and also that such compounds containing alkyl substituents in the aryl rings are effective. The alkyl groups of the alkoxy, N- or C-alkyl substituents are not limited as to size or nature of the chain, we find that the best effects are generally obtained with compounds in which the alkyl groups contain not more than 5 carbon atoms.

The antioxidants may be incorporated into the rubber by any well known means such as milling them into the mix upon the rolls of an ordinary mill. Moreover, they may be employed in various rubber compounds and in conjunction with other known antioxidants such as N:N'-diphenyl-p-phenylenediamine and phenylnaphthylamines. Also the proportion of antioxidant may be varied within wide limits although under normal circumstances about 1% of antioxidant based on the rubber content of the mix has been found adequate. These materials are also effective in the preservation of other rubber-like materials such as gutta-percha, balata and synthetic rubbery materials.

While we have disclosed the preferred embodiments of our invention, and the preferred modes of carrying the same into effect, it will be obvious to those skilled in the art that many variants and modifications may be made therein without departing from the spirit of our invention. Accordingly our invention is to be limited solely by the appended claims construed as broadly as is permissible in view of the prior art.

We claim:

1. The process for the manufacture of vulcanized rubber having improved resistance to deterioration and flex-cracking which comprises incorporating in the rubber 4-methoxy-4'-methyl-N-methyldiphenylamine.

2. Rubber having incorporated therein 4-methoxy-4'-methyl-N-methyldiphenylamine.

WILLIAM BAIRD.
RICHARD FRANK GOLDSTEIN.
MALDWYN JONES.
EDWIN MARSHALL MEADE.